April 12, 1949.    H. K. PERRILL    2,466,908
HYDRAULIC PULSATOR SYSTEM
Filed May 18, 1946    3 Sheets-Sheet 1
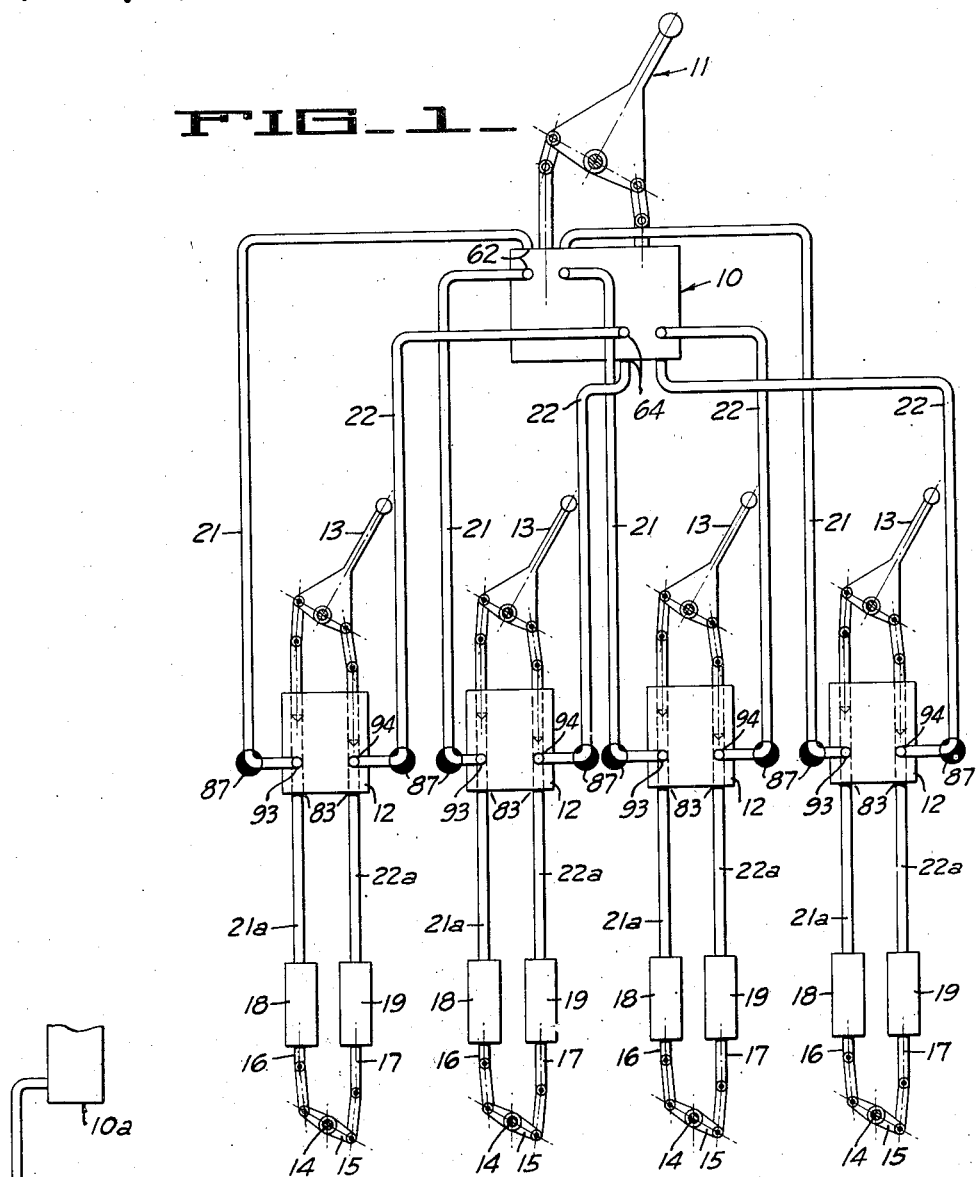
FIG_1_
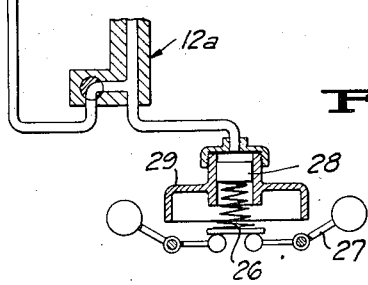
FIG_2_
INVENTOR.
Harlan K. Perrill
BY
ATTORNEY April 12, 1949. H. K. PERRILL 2,466,908
HYDRAULIC PULSATOR SYSTEM
Filed May 18, 1946 3 Sheets-Sheet 2
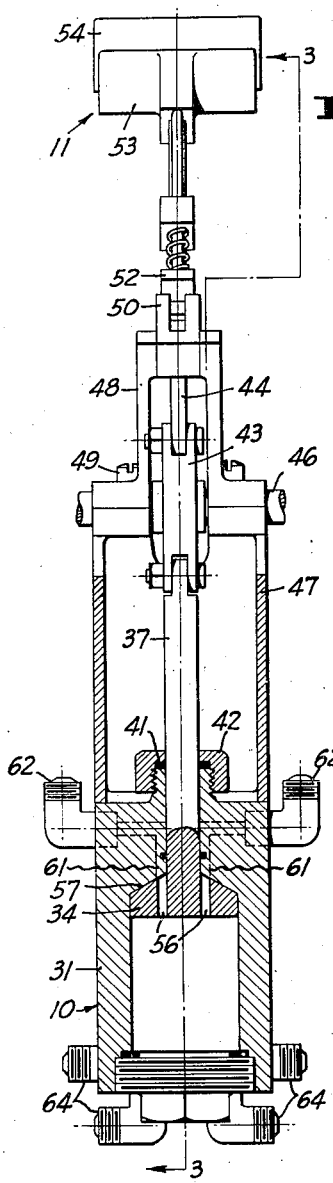
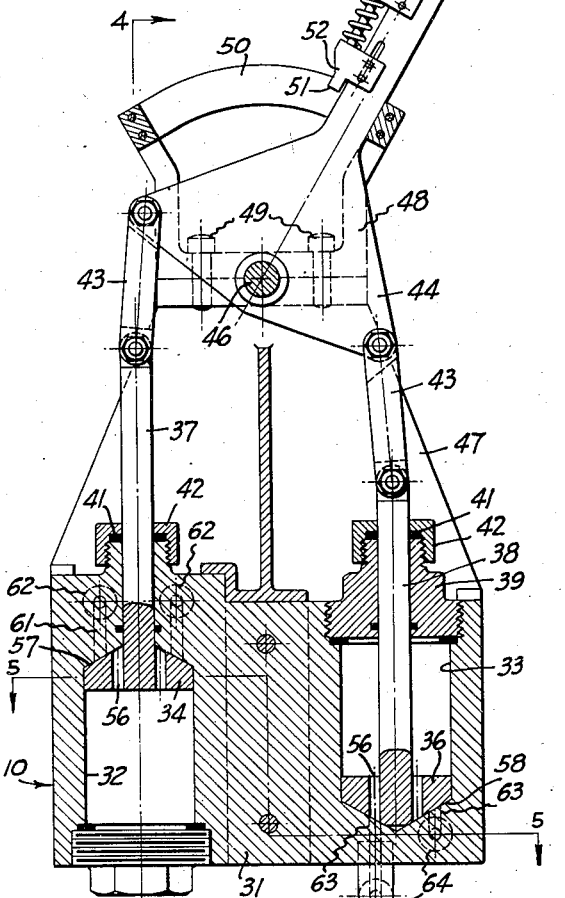
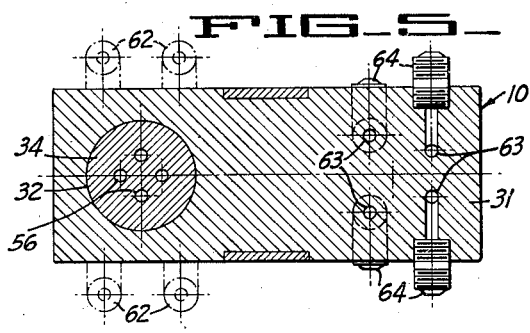
INVENTOR.
Harlan K. Perrill
BY
ATTORNEY April 12, 1949. H. K. PERRILL 2,466,908
HYDRAULIC PULSATOR SYSTEM
Filed May 18, 1946 3 Sheets-Sheet 3
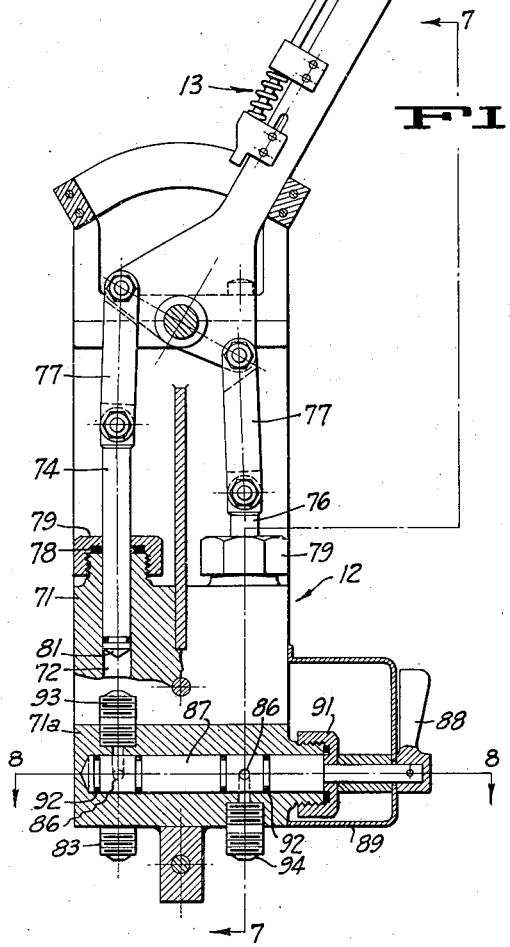
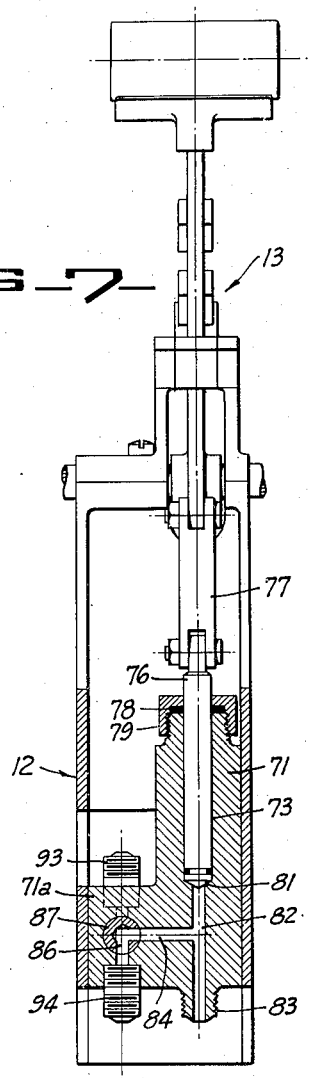
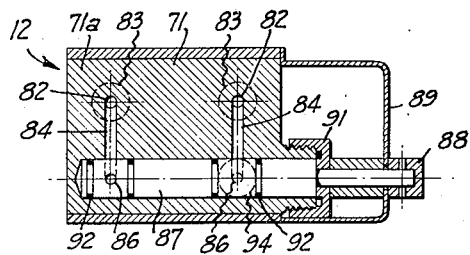
INVENTOR.
Harlan K. Perrill
BY
ATTORNEY Patented Apr. 12, 1949

2,466,908

UNITED STATES PATENT OFFICE 2,466,908

HYDRAULIC PULSATOR SYSTEM

Harlan K. Perrill, Oakland, Calif.

Application May 18, 1946, Serial No. 670,755

6 Claims. (Cl. 60—54.5)

This invention relates to hydraulic control systems and is concerned more particularly with the provision of a hydraulic control throttle system for use in controlling the operation of multiple power plants, for example, of the type employed in multi-engine airplanes, speed boats and locomotives.

It is a general object of the invention to provide an improved throttle control system of the above character which enables a flexible control of the power plants under varying conditions and requirements of the operation of such plants.

Another object of the invention is to provide a throttle control system of the above character which enables automatic synchronizing of multiple control devices to maintain coordinated engine speeds in a multiple power plant, and optionally to enable individual independent operation of the units of the power plant when desired.

A further object of the invention is to provide a control system attaining the foregoing objects and which enables independent emergency cut-off of any one power plant when required.

Still another object of the invention is to provide a hydraulic control system which is simple and reliable in its operation and which lends itself to the foregoing objects.

Other objects of the invention will be apparent from the following description of a preferred embodiment thereof as illustrated in the accompanying drawings, in which:

Figure 1 is a schematic elevational view of a throttle control system including a master hydraulic control unit connected for controlling the operation of a four-unit power plant in conjunction with four individual hydraulic control units associated with the respective units of the power plant.

Figure 2 is a schematic view of a control system of the type employed in conjunction with spring-urged elements, such as governor elements, for example.

Figure 3 is a sectional view through the master hydraulic unit of the control system, the view being taken as indicated by the line 3—3 in Figure 4.

Figure 4 is a sectional view through a portion of the master hydraulic unit taken as indicated by the line 4—4 in Figure 3.

Figure 5 is a horizontal sectional view of the unit taken in planes indicated by the line 5—5 in Figure 3.

Figure 6 is a sectional elevational view of an individual hydraulic unit.

Figure 7 is a sectional elevational view of the unit shown in Figure 6, being taken as indicated by the line 7—7 in Figure 6.

Figure 8 is a horizontal sectional view through the emergency cut-off valve of the unit shown in Figure 6, the view being taken as indicated by the line 8—8 in Figure 6.

In the operation of vehicles or other apparatus employing multiple unit power plants, for example, in multi-engine airplanes, it is necessary that the pilot be provided with a flexible control system of the throttles of the various engines of the power plant which will enable easy, fast operation to control the speeds of the various engines for maneuvering and which will relieve the pilot of the necessity for synchronizing the speeds where it is desired to maintain constant speed operation of all of the engines. In accordance with the instant invention, the desirable features of simultaneous or individual control of engine speed, propeller speed or the like is provided by means of a hydraulic control system embodying a master control unit which can be placed in control of the entire system and a plurality of individual control units which can be operated for individual control with the master control unit disabled or ineffective.

For example, referring to Figure 1, there is illustrated schematically a suitable form of hydraulic control system including a master unit 10 having an operating handle 11 associated therewith and a plurality of individual control units 12 having respective operating handles 13 associated therewith. In this case there are provided four throttle control shafts 14, each of which can be operated through a lever 15 from the respective plungers 16 and 17 of operating cylinders 18 and 19. The cylinder 18 may be designated an increase cylinder while 19 is a decrease cylinder. The respective cylinders 18 and 19 are connected through respective conduits 21a and 22a to one of the individual control units 12, and by branch conduits 21 and 22 leading from the individual control unit 12 to the master control unit 10. In this type of installation, both the master control unit 10 and each of the individual control units 12 are provided with increase and decrease cylinder and plunger units so that positive operation of the plungers 16 and 17 may be provided in both directions.

In the form of control systems shown in Figure 2, the master control unit 10a and the individual control unit 12a operate against the pressure of a spring 26 in association with the governor elements 27, so that the plunger 28 within the cylinder 29 is operated by the hydraulic fluid in one direction and by the spring 26 in the other direction. In this case only one cylinder-plunger unit is necessary in the respective control units.

The master control unit is illustrated in detail in Figures 3 to 5, inclusive, and includes a body 31 in which respective increase and decrease cylinders 32 and 33 are machined. Respective plungers 34 and 36 are provided within the cylinders 32 and 33 with operating shafts 37 and 38 extending outwardly through one end wall of the cylinder 32 and through a closure 39 for the cylinder 33. Respective packing glands 41 and compression caps 42 are provided about each of shafts 37 and 38. The respective shafts 37 and 38 are connected by links 43 to the bell crank lower end 44 of the operating handle 11 which is pivotally mounted on a cross shaft 46 supported on a bracket 47 and a shaft retaining cap 48 secured thereon by cap screws 49. The cap 48 is provided with an arcuate locking strap 50 having a notch 51 cooperating with a spring-urged lock 52 which is slidably mounted on the handle 11 and has a release handle 53 disposed below the handle portion 54 of the handle structure 11. As shown, the plungers 34 and 36 are locked in inoperative position by the handle structure.

In accordance with the instant invention, means is provided for by-passing liquid between respective portions of the cylinder at either side of the plunger or piston and the plungers 34 and 36 are of the apertured type to pass the hydraulic fluid freely from one side to the other of the plungers. In this case the plungers are provided with four apertures 56 which extend to the ground conical upper face 57 of the plunger 34 and similar lower face 58 of the plunger 36. These conical faces 57 and 58 mate with and seat against similar ground conical end surfaces of the cylinders 32 and 33 to provide a seal. If desired, a rubber gasket could be employed between these sealing surfaces.

The end wall of the cylinder 32 (Figures 3 and 4) is provided with four drilled outlet passages 61 which extend from the conical end of the cylinder 32 to the four connecting nipples 62 which, as previously described, are connected by the respective conduits 21 to the respective increase cylinders 18 of the throttle operating linkages. The conical end wall of the cylinder 33 is similarly provided with four drilled passages 63 which are connected to connecting nipples 64 which, as previously described, are connected by the conduits 22 to the decrease cylinders 19 of the throttle control linkages. As clearly seen in Figure 3, the drilled passages 56 of the plungers 34 are offset with respect to the drilled passages 61, so that in the seating position of the plunger 34 these passages are disconnected. Similarly, the drilled passages 56 of the plunger 36 are offset from the drilled passages 63 in the decrease cylinder so that these passages are similarly closed in the seating position of the plunger 36.

It is well recognized that there is a certain degree of elasticity or compressibility in the liquids used in such systems. The slight degree of elasticity or compressibility of the liquid within the cylinders 32 and 33 will permit a very slight initial movement of the pistons 34 and 36. This movement, even though slight, is sufficient to permit the passage of liquid through orifices 56 and also to permit the conical faces 57 and 58 to be separated slightly from the corresponding surfaces of cylinders 32 and 33. In this manner, initial movement of the pistons will take place and the flow of oil or other hydraulic fluid through the orifices 56 and 61 will take place.

From the above description it will be apparent that upon movement of the control handle 11 counter-clockwise from the position shown in Figure 3, the respective plungers 34 and 36 will move within their cylinders 32 and 33 opening the passageways 61 and 63 and causing a flow of hydraulic fluid through the respective plunger passages 56 from one side of each plunger to the other. It will also be apparent that the effective volume of each of the cylinders 32 and 33 is changed by the volume of the shaft 37 or 38, respectively, which is disposed within the respective cylinder. Thus, in Figure 3, the cylinder 32 contains its maximum volume of hydraulic fluid, while the cylinder 33 contains its minimum volume, so that movement of the handle 11 will result in displacement of fluid from the cylinder 32 and intake of fluid into the cylinder 33. As will be later pointed out, this amount of fluid is in definite volumetric relation to fluid displacement within the individual control units which will now be described.

As each of the individual control units is of identical construction, only one will be described in detail. Referring to Figures 6 to 8, each individual control unit 12 includes a body 71 having similar increase and decrease cylinders 72 and 73 drilled therein. Respective increase and decrease plungers 74 and 76 are disposed within the respective cylinders and are connected by links 77 with the operating handle 13. The handle 13 is of the same general structure and mounting as the operating handle 11 of the master unit. Respective sealing gaskets 78 and clamping caps 79 are associated with each of the plungers 74 and 76.

Each of the plungers 74 and 76 (Figures 6 to 8) is provided with a conical lower end 81 adapted to engage a conical seat at the lower end of the associated cylinder from which a drilled passageway 82 extends. The lower portion of this passageway 82 leads to a fitting by means of which the individual cylinders may be connected to the associated operating cylinders. Each passageway 82 is provided with a branch 84 leading to an L-shaped passage 86 in a cylindrical cut-off valve 87 disposed within a cylindrical bore of an extension 71a of the body. The valve 87 has an operating handle 88 disposed exteriorly of the body adjacent a casing 89 which houses the closure caps 91 of the respective cut-off valves described above. Adjacent each section of the shaft 87 provided with the L-shaped passage 86, the shaft 87 is grooved to receive a sealing gasket 92. One of the L-shaped passages 86 is adapted to register with an increase nipple 93 and the other with a decrease nipple 94 which, as previously described, are connected by the respective branch conduits 21 and 22 to the increase and decrease cylinders of the master control unit.

As shown in Figures 6 to 8, the cut-off valve is positioned to place the cylinders 72 and 73 in operative relation with respect to this system. However, if the operating handle 88 of a particular cut-off valve is moved clockwise, as viewed in Figure 1, then the passageways 84 are blocked and the particular individual throttle is disconnected from the master cylinder and the master cylinder is ineffective with respect to this individual control.

From the above description it will be seen that, assuming the master throttle is inactive, the rocking of the handle 13 of an individual throttle, as shown in Figure 6, will operate the increase cylinder 18 and the decrease cylinder 19, so that an individual adjustment of the particular throttle control handle 13 can be effected.

To provide for uniform actuation of the increase and decrease actuating cylinders 18 and 19 either by the master throttle unit or their individual throttle units, the shaft portion of the master throttle plungers have such diameter and length of stroke that the volume increase or decrease within the respective master cylinders is equal to the combined volumes of all of the corresponding individual plungers. Thus, as the master increase plunger, for example, moves down, as viewed in Figure 3, the volume available for fluid is decreased by the volume of the shaft 37 which enters the cylinder 32, and fluid is displaced from the cylinder 32 and is forced through the conduits 21 and 21a into the increase cylinder 18 which operates the plunger of the decrease cylinder 19 which correspondingly transmits fluids back through the lines 22 and 22a to the master decrease cylinder 33. If the individual throttles are locked in closed position, as shown in Figure 6, the connection through the conduits 21a and 22a is ineffective to produce any change in the adjustment of the single throttle plungers 74 and 76.

If during operation one of the engines gets out of synchronization, the tendency to become synchronized will exert a force on the piston 28 (Figure 2) of this control unit which will (through the interconnection of the various lines 21 and 22 to the master throttle chambers 32 and 33) produce or tend to produce a corresponding change in all of the other governor units. Thus, any individual condition in connection with an individual engine of a power plant when the master throttle control is active will be automatically compensated for and at all times the interconnected hydraulic system insures a similar position of all of the governor pistons 28.

On the other hand, when it is desired for some operating reason to provide for different engine speeds, the individual throttle handles are unlocked and moved as a gang and at the same time the master throttle is restored to locked condition. In this way the fluid displaced from or taken in by the master control cylinder is balanced by the displacement of the various individual increase and decrease plungers 74 and 76. After the above adjustment, each individual plunger is in control of its associated throttle control shaft and the desired individual adjustment of the various engine speeds can be effected.

In case of any emergency, such as damage to an individual engine, the individual engine can be cut off from the control system by operating the emergency cut-off valve 87 so that the individual throttle control and the associated operating cylinders 18 and 19 are isolated from the remaining portions of the system which remain under control of the master throttle unit. In performing this operating the single throttle control unit corresponding to the damaged engine is first unlocked and advanced to a position substantially equal to that of the master throttle control unit after which the cut-off valve is closed. In this condition of the parts the individual throttle control unit can then be operated to shut down the engine or to operate it after adjustment or repairs when these can be made.

While I have shown a preferred embodiment of the invention it will be understood that the invention is capable of variation and modification from the form shown so that its scope should be limited only by the scope of the claims appended hereto.

I claim:

1. In a hydraulic throttle control system for a plurality of hydraulically responsive throttle control elements, a master transmitter unit including a master cylinder having inlet and outlet passages and an apertured plunger therein having an operating shaft extending through an end wall of the cylinder, a plurality of individual receiver units each including a cylinder and a plunger therein, said master and individual cylinders being connected in parallel to said throttle control elements, said apertured master plunger having a position blocking the inlet and outlet passages from said master cylinder.

2. In a hydraulic throttle control system for a plurality of hydraulically responsive control elements, a master transmitter unit including a cylinder having a conical end wall and an apertured plunger disposed in said cylinder and having an operating shaft extending through said end wall, said plunger having a conical face to engage said conical end wall, a plurality of individual receiver units each including a cylinder and a plunger therein, said master and individual cylinder being connected in parallel to said throttle control elements, outlet and inlet passages to said master cylinder leading from said end wall, said apertured master plunger blocking said inlet and outlet passages when engaged with said end wall.

3. In a hydraulic throttle control system, a master transmitter including a cylinder and an apertured plunger therein having an operating shaft extending through an end closure of the cylinder, a plurality of individual receivers each including a cylinder and a plunger therein, and conduits leading from said master cylinder end closure to said individual receiver cylinders, said master plunger having an end position adjacent said end closure closing said master cylinder from said individual cylinders.

4. In a hydraulic throttle control system for a plurality of hydraulically responsive control elements, a master transmitter unit including a cylinder and an apertured plunger therein having an operating shaft extending through an end closure of the cylinder, a plurality of individual receivers each including a cylinder and a plunger therein, and conduits leading from said master cylinder end closure through said individual receiver cylinders and to said control elements, and a cut-off valve between each individual cylinder and the conduits leading thereto from the master transmitter control unit.

5. In a hydraulic throttle control system for a plurality of hydraulically responsive throttle control elements, a master transmitter unit including a cylinder having a plunger therein, a plurality of individual receiver units each including a cylinder and a plunger therein, said master and individual cylinders being connected to said throttle control elements, and a cut-off valve between each of the individual receiver units and the master unit and disposed to block control of the master throttle unit over one of the throttle control elements while leaving the associated individual receiver unit effective with respect to the throttle control element.

6. In a hydraulic throttle control system for a plurality of hydraulically responsive throttle control elements, a master transmiter unit including a cylinder having a plunger therein, a plurality of individual receiver units each including a cylinder and a plunger therein, said master and individual cylinders being connected to said throttle control elements, and selectively operable means for blocking control of the master transmitter unit over one of the throttle control elements while leaving the associated individual receiver unit effective with respect to the throttle control element.

HARLAN K. PERRILL.

REFERENCES CITED

The following references are of record in the file of this patent:

UNITED STATES PATENTS

| Number | Name | Date |
|---|---|---|
| 2,182,237 | Rasmussen | Dec. 5, 1939 |
| 2,234,008 | Price | Mar. 4, 1941 |
| 2,243,385 | Levy | May 27, 1941 |
| 2,299,912 | Loweke | Oct. 27, 1942 |
| 2,356,517 | Hale | Aug. 22, 1944 |
| 2,414,302 | Hebel | Jan. 14, 1947 |